US009232062B2

(12) United States Patent
Dickinson

(10) Patent No.: US 9,232,062 B2
(45) Date of Patent: *Jan. 5, 2016

(54) MOBILE AUTOMATIC LOCATION IDENTIFICATION (ALI) FOR FIRST RESPONDERS

(71) Applicant: TeleCommunication Systems, Inc., Annapolis, MD (US)

(72) Inventor: Richard Dickinson, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/219,667

(22) Filed: Mar. 19, 2014

(65) Prior Publication Data
US 2014/0205075 A1 Jul. 24, 2014

Related U.S. Application Data

(63) Continuation of application No. 13/317,783, filed on Oct. 28, 2011, now Pat. No. 8,681,946, which is a continuation of application No. 11/705,101, filed on Feb. 12, 2007, now Pat. No. 8,050,386.

(51) Int. Cl.
H04M 11/04 (2006.01)
H04M 3/51 (2006.01)
(Continued)

(52) U.S. Cl.
CPC ............ H04M 3/5116 (2013.01); H04L 12/66 (2013.01); H04W 76/007 (2013.01)

(58) Field of Classification Search
CPC .......... H04M 3/5116; H04M 2242/04; H04M 3/42348; H04W 4/22
USPC .......................................................... 379/45
See application file for complete search history.

(56) References Cited

U.S. PATENT DOCUMENTS 1,103,073 A 7/1914 O'Connell
4,445,118 A 4/1984 Taylor
(Continued)

FOREIGN PATENT DOCUMENTS

GB WO01/45342 6/2001
WO WO99/22546 5/1999
(Continued)

OTHER PUBLICATIONS

International Search Report in PCT/US/2010/01938 dated Sep. 30, 2010.
(Continued)

Primary Examiner — Alexander Jamal
(74) Attorney, Agent, or Firm — William H. Bollman

(57) ABSTRACT

Automatic Location Indication (ALI) data is digitally transferred from a Public Safety Answering Point (PSAP) to a first responder via a web site accessed by the first responder. The web site lists each live E911 call within their jurisdiction, and appends the caller's ALI and/or other location data relative to each call. Preferably the first responders (e.g., police car, paramedic, ambulance, fire truck, etc.) can view not only the emergency caller's information for those E911 calls that they are responding to, but also information about other emergency callers that other first responders are responding to. This facilitates the actual response to individual emergency calls as well as the overall management of multiple responders to multiple emergency calls.

14 Claims, 4 Drawing Sheets

(51) Int. Cl.
*H04L 12/66* (2006.01)
*H04W 76/00* (2009.01)

(56) References Cited

U.S. PATENT DOCUMENTS

| | | | |
|---|---|---|---|
| 4,494,119 A | 1/1985 | Wimbush |
| 4,625,081 A | 11/1986 | Lotito |
| 4,651,156 A | 3/1987 | Martinez |
| 4,706,275 A | 11/1987 | Kamil |
| 4,868,570 A | 9/1989 | Davis |
| 4,891,638 A | 1/1990 | Davis |
| 4,891,650 A | 1/1990 | Scheffer |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Scheffer |
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Scheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaugh |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,689,245 A | 11/1997 | Noreen |
| 5,699,053 A | 12/1997 | Jonsson |
| 5,717,688 A | 2/1998 | Belanger et al. |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vanttila |
| 5,797,094 A | 8/1998 | Houde |
| 5,797,096 A | 8/1998 | Lupien |
| 5,802,492 A | 9/1998 | DeLorrme |
| 5,806,000 A | 9/1998 | Vo |
| 5,809,415 A | 9/1998 | Rossman |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard |
| 5,930,250 A | 7/1999 | Klok |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Huotari |
| 5,998,111 A | 12/1999 | Abe |
| 5,999,124 A | 12/1999 | Sheynblat |
| 6,014,602 A | 1/2000 | Kithol |

(56) References Cited

U.S. PATENT DOCUMENTS

| | | |
|---|---|---|
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,428 A | 8/2000 | Snyder |
| 6,122,503 A | 9/2000 | Daly |
| 6,122,520 A | 9/2000 | Want |
| 6,124,810 A | 9/2000 | Segal |
| 6,128,664 A | 10/2000 | Yanagidate |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schnieder |
| 6,178,506 B1 | 1/2001 | Quick, Jr. |
| 6,181,935 B1 | 1/2001 | Gossman |
| 6,181,939 B1 | 1/2001 | Ahvenainen |
| 6,188,354 B1 | 2/2001 | Soliman |
| 6,188,752 B1 | 2/2001 | Lesley |
| 6,188,909 B1 | 2/2001 | Alananra |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Windbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feague |
| 6,249,680 B1 | 6/2001 | Wax |
| 6,249,744 B1 | 6/2001 | Morita |
| 6,249,873 B1 | 6/2001 | Richard |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,321,091 B1 | 11/2001 | Holland |
| 6,321,092 B1 | 11/2001 | Fitch |
| 6,321,257 B1 | 11/2001 | Kotola |
| 6,324,542 B1 | 11/2001 | Wright, Jr. et al. |
| 6,327,473 B1 | 12/2001 | Soliman |
| 6,327,479 B1 | 12/2001 | Mikkola |
| 6,333,919 B2 | 12/2001 | Gaffney |
| 6,360,093 B1 | 3/2002 | Ross |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,385,459 B1 * | 5/2002 | Lawrence et al. ............. 455/508 |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,427,001 B1 | 7/2002 | Contractor |
| 6,433,734 B1 | 8/2002 | Krasner |
| 6,434,381 B1 | 8/2002 | Moore |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,722 B1 | 3/2003 | Heinrich |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,522 B1 | 4/2003 | Flynn |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | fomukong |
| 6,560,534 B2 | 5/2003 | Abraham |
| 6,564,261 B1 | 5/2003 | Gudjonsson |
| 6,570,530 B2 | 5/2003 | Gaal |
| 6,571,095 B1 | 5/2003 | Koodli |
| 6,574,558 B2 | 6/2003 | Kohli |
| 6,580,390 B1 | 6/2003 | Hay |
| 6,584,307 B1 | 6/2003 | Antonucci |
| 6,584,552 B1 | 6/2003 | Kuno et al. |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,650,288 B1 | 11/2003 | Pitt |
| 6,650,901 B1 | 11/2003 | Schuster |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,674,403 B2 | 1/2004 | Gray et al. |
| 6,677,894 B2 | 1/2004 | Sheynblat |
| 6,678,357 B2 | 1/2004 | Stumer |
| 6,680,694 B1 | 1/2004 | Knockheart |
| 6,687,504 B1 | 2/2004 | Raith |

(56) References Cited

U.S. PATENT DOCUMENTS

| | | |
|---|---|---|
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,266 B1 | 6/2004 | Hundscheidt |
| 6,757,544 B2 | 6/2004 | Rangarajan |
| 6,771,742 B2 | 8/2004 | McCalmont et al. |
| 6,772,340 B1 | 8/2004 | Peinado |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,779,049 B2 | 8/2004 | Wellman |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McGraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermaijden |
| 6,807,534 B1 | 10/2004 | Erickson |
| 6,810,323 B1 | 10/2004 | Bullock |
| 6,813,560 B2 | 11/2004 | Van Diggelen |
| 6,816,111 B2 | 11/2004 | Krasner |
| 6,816,710 B2 | 11/2004 | Krasner |
| 6,816,719 B1 | 11/2004 | Heinonen et al. |
| 6,816,734 B2 | 11/2004 | Wong et al. |
| 6,820,269 B2 | 11/2004 | Baucke et al. |
| 6,829,475 B1 | 12/2004 | Lee |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,842,715 B1 | 1/2005 | Gaal |
| 6,847,618 B2 | 1/2005 | Laursen |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B2 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,876,734 B1 | 4/2005 | Summers |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,940,826 B1 | 9/2005 | Simard |
| 6,940,950 B2 | 9/2005 | Dickinson |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,957,068 B2 | 10/2005 | Hutchinson |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,044 B2 | 11/2005 | Beason |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,996,720 B1 | 2/2006 | DeMello |
| 6,999,782 B2 | 2/2006 | Shaughnessy |
| 7,020,480 B2 | 3/2006 | Coskun |
| 7,024,321 B1 | 4/2006 | Deninger |
| 7,024,393 B1 | 4/2006 | Peinado |
| 7,047,411 B1 | 5/2006 | DeMello |
| 7,065,351 B2 | 6/2006 | Carter |
| 7,065,507 B2 | 6/2006 | Mohammed |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rosseau |
| 7,113,128 B1 | 9/2006 | Pitt |
| 7,130,630 B1 | 10/2006 | Enzmann |
| 7,136,466 B1 | 11/2006 | Gao |
| 7,136,838 B1 | 11/2006 | Peinado |
| 7,151,946 B2 | 12/2006 | Maggenti |
| 7,171,220 B2 | 1/2007 | Belcea |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,184,418 B1 | 2/2007 | Baba |
| 7,194,249 B2 | 3/2007 | Phillips |
| 7,200,380 B2 | 4/2007 | Havlark |
| 7,209,758 B1 | 4/2007 | Moll |
| 7,209,969 B2 | 4/2007 | Lahti |
| 7,218,940 B2 | 5/2007 | Niemenna |
| 7,221,959 B2 | 5/2007 | Lindquist |
| 7,246,187 B1 | 7/2007 | Erza |
| 7,260,186 B2 | 8/2007 | Zhu |
| 7,302,582 B2 | 11/2007 | Snapp |
| 7,321,773 B2 | 1/2008 | Hines |
| 7,330,899 B2 | 2/2008 | Wong |
| 7,366,157 B1 | 4/2008 | Valentine |
| 7,369,508 B2 | 5/2008 | Parantainen |
| 7,369,530 B2 | 5/2008 | Keagy |
| 7,382,773 B2 | 6/2008 | Schoeneberger |
| 7,392,240 B2 | 6/2008 | Scriffignana |
| 7,394,896 B2 | 7/2008 | Norton |
| 7,412,049 B1 | 8/2008 | Koch |
| 7,426,380 B2 | 9/2008 | Hines |
| 7,428,571 B2 | 9/2008 | Ichimura |
| 7,436,785 B1 | 10/2008 | McMullen |
| 7,440,442 B2 | 10/2008 | Grabelsky |
| 7,450,951 B2 | 11/2008 | Vimpari |

(56) References Cited

U.S. PATENT DOCUMENTS

| | | |
|---|---|---|
| 7,453,990 B2 | 11/2008 | Welenson |
| 7,495,608 B1 | 2/2009 | Chen |
| 7,519,353 B2 | 4/2009 | Stevens |
| 7,573,982 B2 * | 8/2009 | Breen et al. ............... 379/45 |
| 7,602,886 B1 | 10/2009 | Beech |
| 7,617,287 B2 | 11/2009 | Vella |
| 7,623,447 B1 | 11/2009 | Faccin |
| 7,702,081 B1 | 4/2010 | Klesper |
| 7,747,258 B2 | 6/2010 | Farmer |
| 7,751,826 B2 | 7/2010 | Gardner |
| 7,783,297 B2 | 8/2010 | Ishii |
| 7,787,611 B1 | 8/2010 | Kotelly |
| 7,881,233 B2 | 2/2011 | Bieselin |
| 7,937,067 B2 | 5/2011 | Maier |
| 8,014,945 B2 | 9/2011 | Cooper |
| 8,150,363 B2 | 4/2012 | Dickinson |
| 8,681,946 B2 * | 3/2014 | Dickinson ............... 379/45 |
| 2001/0011247 A1 | 8/2001 | O'Flaherty |
| 2001/0040886 A1 | 11/2001 | Jimenez |
| 2002/0037735 A1 | 3/2002 | Maggenti |
| 2002/0052214 A1 | 5/2002 | Maggenti |
| 2002/0058515 A1 | 5/2002 | Holler |
| 2002/0061760 A1 | 5/2002 | Maggenti |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086659 A1 | 7/2002 | Lauper |
| 2002/0086676 A1 | 7/2002 | Hendrey |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0118796 A1 * | 8/2002 | Menard et al. ............... 379/45 |
| 2002/0123327 A1 | 9/2002 | Vataja |
| 2002/0126656 A1 | 9/2002 | Park |
| 2002/0158777 A1 | 10/2002 | Flick |
| 2002/0173317 A1 | 11/2002 | Nykanen |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0016804 A1 | 1/2003 | Sheha |
| 2003/0026245 A1 | 2/2003 | Ejzak |
| 2003/0037163 A1 | 2/2003 | Kitada |
| 2003/0040272 A1 | 2/2003 | Lelievre |
| 2003/0065788 A1 | 4/2003 | Salomaki |
| 2003/0069002 A1 | 4/2003 | Hunter |
| 2003/0072318 A1 | 4/2003 | Lam |
| 2003/0078064 A1 | 4/2003 | Chan |
| 2003/0081557 A1 | 5/2003 | Mettala |
| 2003/0086539 A1 | 5/2003 | McCalmont |
| 2003/0096623 A1 | 5/2003 | Kim |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0119521 A1 | 6/2003 | Tipnis |
| 2003/0119528 A1 | 6/2003 | Pew |
| 2003/0125045 A1 | 7/2003 | Riley |
| 2003/0137961 A1 | 7/2003 | Tsirtsis |
| 2003/0148757 A1 | 8/2003 | Meer |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0186709 A1 | 10/2003 | Rhodes |
| 2003/0196105 A1 | 10/2003 | Fineburg |
| 2003/0204640 A1 | 10/2003 | Sahineja |
| 2003/0223381 A1 | 12/2003 | Schroderus |
| 2004/0002326 A1 | 1/2004 | Maher |
| 2004/0043775 A1 | 3/2004 | Kennedy |
| 2004/0044623 A1 | 3/2004 | Wake |
| 2004/0068724 A1 | 4/2004 | Gardner |
| 2004/0076277 A1 | 4/2004 | Kuusinen |
| 2004/0097243 A1 | 5/2004 | Zellner |
| 2004/0098497 A1 | 5/2004 | Banet |
| 2004/0132465 A1 | 7/2004 | Mattila |
| 2004/0146040 A1 | 7/2004 | Phan-Anh |
| 2004/0150518 A1 | 8/2004 | Philips |
| 2004/0152493 A1 | 8/2004 | Phillips |
| 2004/0166809 A1 | 8/2004 | Dickey |
| 2004/0176123 A1 | 9/2004 | Chin |
| 2004/0180671 A1 | 9/2004 | Spain |
| 2004/0181689 A1 | 9/2004 | Kiyoto |
| 2004/0182493 A1 | 9/2004 | Chick |
| 2004/0184584 A1 | 9/2004 | McCalmont |
| 2004/0190497 A1 | 9/2004 | Know |
| 2004/0192271 A1 | 9/2004 | Eisner |
| 2004/0198332 A1 | 10/2004 | Lundsgaard |
| 2004/0198386 A1 | 10/2004 | Dupray |
| 2004/0203568 A1 | 10/2004 | Kirtland |
| 2004/0203575 A1 | 10/2004 | Chin |
| 2004/0203732 A1 | 10/2004 | Brusilovsky |
| 2004/0205151 A1 | 10/2004 | Sprigg |
| 2004/0215687 A1 | 10/2004 | Klemba |
| 2004/0225740 A1 | 11/2004 | Klemba |
| 2004/0229632 A1 | 11/2004 | Flynn |
| 2004/0242238 A1 | 12/2004 | Wang |
| 2004/0247090 A1 | 12/2004 | Nurmela |
| 2004/0258021 A1 | 12/2004 | Kashimoto |
| 2004/0267445 A1 | 12/2004 | De Luca |
| 2005/0003797 A1 | 1/2005 | Baldwin |
| 2005/0021769 A1 | 1/2005 | Kim |
| 2005/0028034 A1 | 2/2005 | Gantman |
| 2005/0030977 A1 | 2/2005 | Casey |
| 2005/0039178 A1 | 2/2005 | Marolia |
| 2005/0041578 A1 | 2/2005 | Huotari |
| 2005/0043037 A1 | 2/2005 | Loppe |
| 2005/0043038 A1 | 2/2005 | Maanoja |
| 2005/0048987 A1 | 3/2005 | Glass |
| 2005/0053209 A1 | 3/2005 | D'Evelyn |
| 2005/0063519 A1 | 3/2005 | James |
| 2005/0078612 A1 | 4/2005 | Lang |
| 2005/0083911 A1 | 4/2005 | Grabelsky |
| 2005/0085257 A1 * | 4/2005 | Laird et al. ............... 455/550.1 |
| 2005/0086467 A1 | 4/2005 | Asokan |
| 2005/0090236 A1 | 4/2005 | Schwinke |
| 2005/0101335 A1 | 5/2005 | Kelly |
| 2005/0107673 A1 | 5/2005 | Ball |
| 2005/0111630 A1 | 5/2005 | Potorny |
| 2005/0112030 A1 | 5/2005 | Gaus |
| 2005/0119012 A1 | 6/2005 | Merheb |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0153706 A1 | 7/2005 | Niemenmaa |
| 2005/0169248 A1 | 8/2005 | Truesdale |
| 2005/0190892 A1 | 9/2005 | Dawson |
| 2005/0192822 A1 | 9/2005 | Hartenstein |
| 2005/0201358 A1 | 9/2005 | Nelson |
| 2005/0201528 A1 | 9/2005 | Meer |
| 2005/0201529 A1 | 9/2005 | Nelson |
| 2005/0209995 A1 | 9/2005 | Aksu |
| 2005/0213716 A1 | 9/2005 | Zhu |
| 2005/0259675 A1 | 11/2005 | Tuohino |
| 2005/0261002 A1 | 11/2005 | Cheng |
| 2005/0265318 A1 | 12/2005 | Khartabil |
| 2005/0282518 A1 | 12/2005 | D'Evelyn |
| 2005/0287979 A1 | 12/2005 | Rollender |
| 2005/0289097 A1 | 12/2005 | Trossen |
| 2006/0026288 A1 | 2/2006 | Acharya |
| 2006/0053225 A1 | 3/2006 | Poikselka |
| 2006/0058049 A1 | 3/2006 | McLaughlin |
| 2006/0058951 A1 | 3/2006 | Cooper |
| 2006/0068753 A1 | 3/2006 | Karpen |
| 2006/0069503 A1 | 3/2006 | Suomela |
| 2006/0077911 A1 | 4/2006 | Shaffer |

(56) References Cited

U.S. PATENT DOCUMENTS

| | | |
|---|---|---|
| 2006/0078094 A1 | 4/2006 | Breen |
| 2006/0088152 A1 | 4/2006 | Green |
| 2006/0120517 A1 | 6/2006 | Moon |
| 2006/0125692 A1 | 6/2006 | Wang |
| 2006/0128395 A1 | 6/2006 | Muhonen |
| 2006/0135132 A1 | 6/2006 | Cai |
| 2006/0135177 A1 | 6/2006 | Winterbottom |
| 2006/0188083 A1 | 8/2006 | Breen |
| 2006/0212558 A1 | 9/2006 | Sahinoja |
| 2006/0212562 A1 | 9/2006 | Kushwaha |
| 2006/0222151 A1 | 10/2006 | Goldman |
| 2006/0224752 A1 | 10/2006 | Parekh |
| 2006/0234639 A1 | 10/2006 | Kushwaha |
| 2006/0234698 A1 | 10/2006 | Fok |
| 2006/0239205 A1 | 10/2006 | Warren |
| 2006/0250987 A1 | 11/2006 | White |
| 2006/0258380 A1 | 11/2006 | Liebowitz |
| 2006/0281437 A1 | 12/2006 | Cook |
| 2006/0281470 A1 | 12/2006 | Shi |
| 2006/0293024 A1 | 12/2006 | Benco |
| 2006/0293066 A1 | 12/2006 | Edge |
| 2007/0003024 A1 | 1/2007 | Olivier |
| 2007/0004429 A1 | 1/2007 | Edge |
| 2007/0010248 A1 | 1/2007 | Dravida |
| 2007/0021098 A1 | 1/2007 | Rhodes |
| 2007/0021908 A1 | 1/2007 | Jaugilas |
| 2007/0022011 A1 | 1/2007 | Altberg |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0036139 A1 | 2/2007 | Patel |
| 2007/0041513 A1 | 2/2007 | Gende |
| 2007/0049288 A1 | 3/2007 | Lamprecht |
| 2007/0060097 A1 | 3/2007 | Edge |
| 2007/0081635 A1 | 4/2007 | Croak |
| 2007/0117574 A1 | 5/2007 | Watanabe |
| 2007/0117577 A1 | 5/2007 | Harris |
| 2007/0121601 A1 | 5/2007 | Kikinis |
| 2007/0149166 A1 | 6/2007 | Turcotte |
| 2007/0149213 A1 | 6/2007 | Lamba |
| 2007/0160036 A1 | 7/2007 | Smith |
| 2007/0162228 A1 | 7/2007 | Mitchell |
| 2007/0201623 A1 | 8/2007 | Hines |
| 2007/0206568 A1 | 9/2007 | Silver |
| 2007/0206613 A1 | 9/2007 | Silver |
| 2007/0242660 A1 | 10/2007 | Xu |
| 2007/0253429 A1 | 11/2007 | James |
| 2007/0254625 A1 | 11/2007 | Edge |
| 2007/0263610 A1 | 11/2007 | Mitchell |
| 2007/0270164 A1 | 11/2007 | Maier |
| 2007/0291733 A1 | 12/2007 | Doran |
| 2007/0293205 A1 | 12/2007 | Henderson |
| 2008/0032703 A1 | 2/2008 | Krumm |
| 2008/0037715 A1 | 2/2008 | Prozeniuk |
| 2008/0045250 A1 | 2/2008 | Hwang |
| 2008/0063153 A1 | 3/2008 | Krivorot |
| 2008/0065775 A1 | 3/2008 | Polk |
| 2008/0081646 A1 | 4/2008 | Morin |
| 2008/1178595 | 5/2008 | Shahidi |
| 2008/0137624 A1 | 6/2008 | Silverstrim |
| 2008/0162637 A1 | 7/2008 | Adamczyk |
| 2008/0176582 A1 | 7/2008 | Ghai |
| 2008/0186164 A1 | 8/2008 | Emigh |
| 2008/0192731 A1* | 8/2008 | Dickinson ............ 370/352 |
| 2008/0200182 A1 | 8/2008 | Shim |
| 2008/0214202 A1 | 9/2008 | Toomey |
| 2009/0003535 A1 | 1/2009 | Grabelsky |
| 2009/0067417 A1 | 3/2009 | Kalavade |
| 2009/0097450 A1 | 4/2009 | Wallis |
| 2009/0128404 A1 | 5/2009 | Martino |
| 2009/0221263 A1 | 9/2009 | Titus |
| 2009/0275350 A1* | 11/2009 | Poremba ............ 455/466 |
| 2010/0003954 A1 | 1/2010 | Greene |
| 2010/0003976 A1 | 1/2010 | Zhu |
| 2010/0054220 A1 | 3/2010 | Bischinger |
| 2010/0067444 A1 | 3/2010 | Faccin |
| 2010/0076767 A1 | 3/2010 | Vieri |
| 2010/0167760 A1 | 7/2010 | Kim |
| 2010/0188992 A1 | 7/2010 | Raleigh |
| 2010/0198933 A1 | 8/2010 | Smith |
| 2010/0223222 A1 | 9/2010 | Zhou |
| 2011/0113060 A1 | 5/2011 | Martini |
| 2013/0012232 A1 | 1/2013 | Titus et al. |

FOREIGN PATENT DOCUMENTS

| | | |
|---|---|---|
| WO | WO02/11407 | 2/2002 |
| WO | WO2004/025941 | 3/2004 |
| WO | WO2004/098213 | 11/2004 |

OTHER PUBLICATIONS

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

Schulzrinne et al., Emergency Services for Internet Telephony Systems draft-schulzrinne-sipping-emergency-arch, IETF Standard Working Draft, Feb. 4, 2004, 1-22.

European Search Report in European Appl. No. 06827172.5-1525 dated Dec. 29, 2009.

"Location Services (LCS); Functional Description; Stage 2; ETSI TS 101 724", ETSI Standards, Jun. 2004.

European Search Report received in European Appl. No. 06851433.0-2413/1935191 dated Aug. 8, 2011.

* cited by examiner

MOBILE AUTOMATIC LOCATION IDENTIFICATION (ALI) FOR FIRST RESPONDERS

The present application is a continuation of U.S. application Ser. No. 13/317,783, entitled "Mobile Automatic Location Identification (ALI) for First Responders", filed on Oct. 28, 2011; which in turn is a continuation of U.S. application Ser. No. 11/705,101, entitled "Mobile Automatic Location Identification (ALI) for First Responders", filed on Feb. 12, 2007, now U.S. Pat. No. 8,050,386, the entirety of both of which are expressly incorporated herein by reference.

BACKGROUND OF THE INVENTION

1. Field of the Invention

This invention relates to emergency call systems (e.g., E9-1-1), including wireless and Internet Protocol (IP) based Voice Over Internet Protocol (VoIP) emergency call systems, that rely on non-call associated signaling in order to provide location data.

2. Background of the Related Art 9-1-1 is a phone number widely recognized in North America as an emergency phone number that is used to contact emergency dispatch personnel. Enhanced 9-1-1 (E9-1-1) is defined by an emergency call being selectively routed to an appropriate PSAP, based on a special identifier (P-ANI, or "Pseudo Automatic Number Identifier", also referred to as "ESxK"), and includes the transmission of callback number and location information when 9-1-1 is used. E9-1-1 may be implemented for landline, cellular or VoIP networks. A Public Service Answering Point (PSAP) is a dispatch office that receives 9-1-1 calls from the public. A PSAP may be a local, fire or police department, an ambulance service or a regional office covering all services. As used herein, the term "PSAP" refers to either a public safety access point (PSAP), or to an Emergency Call Center (ECC), a VoIP term.

Regardless of the network type, a 9-1-1 service becomes E-9-1-1 when automatic number identification and automatic location information related to the call is provided to the 9-1-1 operator at the PSAP. A primary challenge results from the fact that calls may arrive at the PSAP without the caller's actual callback number or location information displayed at the emergency operator's terminal.

FIG. 3 shows a conventional landline public safety access point (PSAP) to automatic location identifier (ALI) connection.

In particular, FIG. 3 shows a PSAP 400 connected to one Automatic Location Identifier (ALI) database 401. Upon receiving a 9-1-1 call, the PSAP 400 queries the ALI 401 for location data. The ALI database 401 accepts the query from the PSAP 400 for location. The query includes the telephone number of an emergency caller. The ALI database 401 relates the received telephone number to a physical street address and provides that street address (location information) back to the PSAP 400 in a manner that works for the customer premise equipment (CPE) display at the PSAP 400.

An ALI is typically owned by a local exchange carrier (LEC) or a PSAP, and may be regional (i.e. connected to many PSAPs) or standalone (i.e. connected to only one PSAP). There is currently no one single standard interface protocol for PSAP-ALI connection/communication.

FIG. 4 shows a context diagram for a conventional non-landline positioning center (e.g., an Internet based voice over Internet Protocol (VoIP) positioning center).

In particular, the ALI database 401a includes a conventional emergency services key (ESQK or ESRK) in a location request sent to an appropriate positioning center 402 (XPC). The emergency services key (ESQK or ESRK) is used by the positioning center 402 as a key to look up the location and other call information associated with the emergency call.

In non-landline telephony, the PSAPs 400a query the ALI 401a for location information. However, the ALI 401a is not pre-provisioned with location data for non-landline calls (e.g. cellular, VoIP etc) and must communicate with other network entities to obtain and deliver location data to the PSAP 400. Non-landline telephony standards (e.g. cellular, VoIP etc) have mandated that ALIs 401a maintain connectivity to a positioning center 402 that is able to provide current location data for a non-landline call. In the current state of technology, the positioning center 402 provides the caller's location and the callback number to the ALI, which passes it to the requesting PSAP. As can be seen in FIG. 4, an ALI may maintain connectivity to more than one positioning center via multiple interface types—both standard and non-standard (e.g. NENA-02, E2/E2+/V-E2(ESP), PAM, etc.).

As used herein, the generic term "XPC" refers interchangeably to any standards-based positioning center. As examples, a positioning center 402 may be any one of the following types used in non-landline networks:

GMLC (Gateway Mobile Location Center): The positioning center that retrieves, forwards, stores and controls emergency position data within the GSM location network.

MPC (Mobile Position Center): The positioning center that retrieves, forwards, stores and controls emergency position data within the ANSI location network.

VPC (VoIP Positioning Center): The positioning center which retrieves, forwards, stores and controls emergency position data within the VoIP location network.

The term "XPC network" is used herein when appropriate to refer to any non-landline network where a positioning center 402 responds to ALI queries including an emergency services key for location, e.g., cellular, VoIP etc.

In the process of handling an emergency call, a first responder (or responders) may be dispatched to the caller's location. Typically, the dispatcher at the Public Safety Answering Points (PSAPs) determines the appropriate first responder(s), and makes contact with a dispatcher for the appropriate first responder. After contact, the PSAP dispatcher (and/or the dispatcher for the first responder) conveys relevant location information to the first responder.

Using conventional techniques, most PSAPs rely on the age-old method of verbally relaying caller Automatic Location Identification (ALI) data to the first responder, i.e., speaking the caller's location information over a voice phone call between the PSAP and the first responder.

While many police and fire department vehicles do have wireless data transfer capabilities, such services are typically used to interact with local or regional databases to check license plates, criminal records, outstanding warrants, etc. No conventional method exists to use wireless data transfer capabilities for downloading ALI data relating to a PSAP's emergency call to a first responder.

While the next generation of E911 services has promised to facilitate the delivery of caller information (name, address, phone number, medical conditions, etc) from an emergency caller to the PSAP, little progress has been made in the second leg of communication, i.e., in relaying this caller information as digital data from the PSAP to the relevant first responder (e.g., police, fire, or medical).

Needless to say, while serving the purpose, verbal relay of location information is slow and prone to error. At best, verbal transfer of ALI information from a PSAP to a first responder delays a lifesaving response, and at worst can result in the dispatch of a first responder to a wrong address.

There is a long felt but unsolved need for efficient transfer of location information relating to a PSAP's emergency call from the PSAP to a first responder.

SUMMARY OF THE INVENTION

In accordance with the principles of the present invention, a method and apparatus for providing location information to a first responder comprises obtaining at a public safety answering point (PSAP), location information regarding a location of an emergency caller. The location information is presented to a web page accessible by a first responder. The first responder is permitted access to the location information via the web page. The location information is displayed on the web page showing an association with a respective emergency call.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention facilitates the transfer of Automatic Location Indication (ALI) data digitally from a Public Safety Answering Point (PSAP) to a first responder.

In particular, the inventive solution provides a web site accessible to first responders that lists each live E911 call within their jurisdiction, and appends the caller's ALI data relative to each call. Preferably the first responders (e.g., police car, paramedic, ambulance, fire truck, etc.) can view not only the emergency caller's information for those E911 calls that they are responding to, but they can also view information about other emergency callers that other first responders are responding to. This facilitates the actual response to individual emergency calls as well as the overall management of multiple responders to multiple emergency calls.

Figure 1:
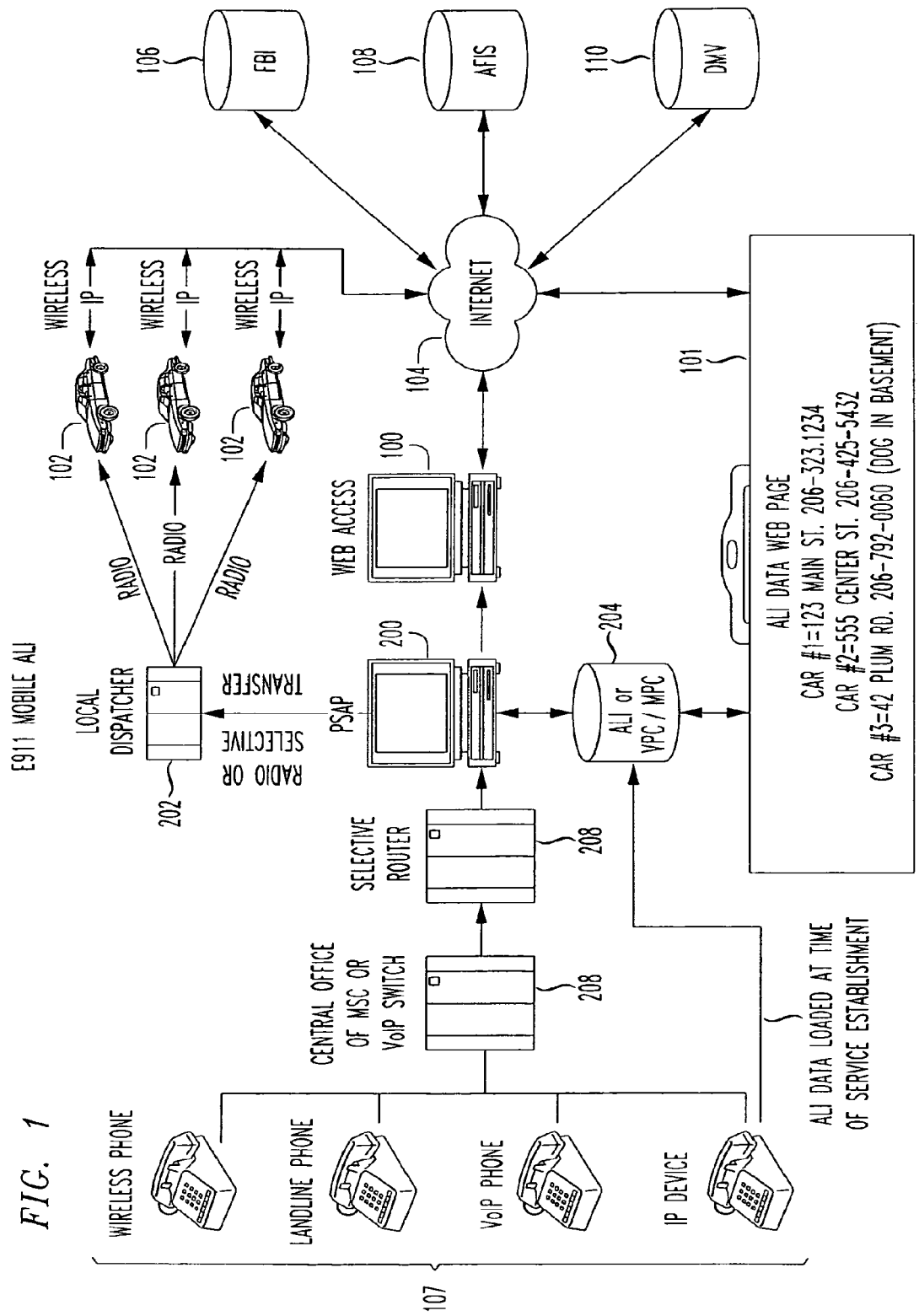
FIG. 1 shows relevant network elements in an E911 mobile ALI system that provides ALI data digitally from a PSAP to a first responder, in accordance with the principles of the present invention.

FIG. 1 shows relevant network elements in an E911 mobile ALI system that provides ALI data digitally from a PSAP to a first responder, in accordance with the principles of the present invention.

In particular, as shown in FIG. 1, an emergency call may be initiated from any type phone device 107, e.g., a wireless phone, a landline phone, a voice over Internet Protocol (VoIP) phone, an Internet Protocol (IP) device, etc.

The emergency call is handled by a relevant central office 208 (landline phone), mobile switching center (wireless phone), or VoIP switch (VoIP phone), and routed to an appropriate public safety answering point (PSAP) 200, e.g., via a selective router 206.

As is otherwise conventionally known, automatic location identification (ALI) location data is obtained for an appropriate ALI, VoIP positioning center (VPC), or mobile positioning center (MPC) 204.

The local dispatcher 202 at the PSAP 200 determines what first responder(s) are appropriate for the given emergency call, and dispatches the appropriate first responder vehicle 102.

Importantly, the first responder vehicles 102 are provided with Internet Protocol (IP) based wireless access capability via the public Internet 104, and a suitable web browser capable of accessing an ALI data web page 101. Suitable exemplary web browsers include, e.g., Internet Explorer from Microsoft Corporation, or Mozilla's Firefox™, etc.

Moreover, in accordance with the present invention, an Internet accessible ALI data web page 101 is hosted by the xPC, with individual ALI data displayed and correlated by ESxK. The PSAP 200 and/or local dispatcher 202 maintain realtime updates by adding the identity of the dispatched unit to the ALI display. Importantly, the web page is accessible by, and the first responder has access to, the Internet (e.g., via an Internet browser such as Internet Explorer™, Firefox™ or the like).

The ALI data web page 101 is capable of displaying location information relating to a current or recent emergency E911 call. ALI information displayed on the ALI data web page 101 may be maintained for a given length of time after a given emergency call terminates, based on an amount of memory available in a host server. If an indefinite amount of memory is available, ALI information displayed on the ALI data web page 101 may correspondingly be available for an indefinite length of time. In any event, the most important purpose of the ALI data web page 101 is to provide first responders to an active or very recent emergency call location information to arrive quickly to render aid to the emergency caller. Thus, even if ALI data is maintained by said ALI data web page 101 for a long length of time, it is preferable that it be subordinate to ALI data relating to current or recent emergency (e.g., E911) phone calls.

As shown in FIG. 1, government agencies such as the Federal Bureau of Investigation (FBI), the relevant Department of Motor Vehicles, the AFIS, etc. may also view the ALI location data posted at the ALI data web page 101. Equally important, the responders may view databases maintained by these agencies via the same internet connection using existing access protocols.

Figure 2:
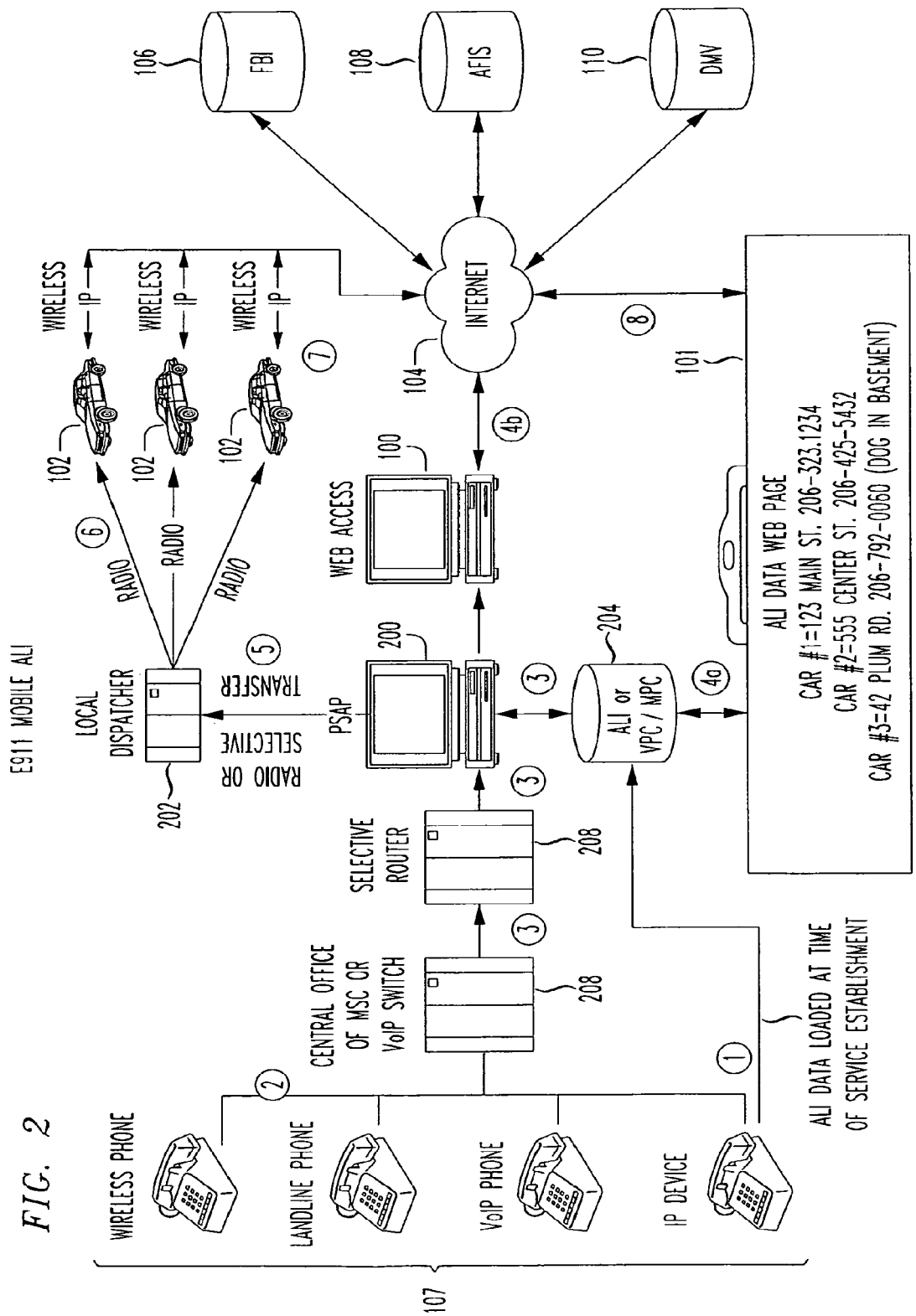
FIG. 2 shows an exemplary mobile ALI call flow tracing a 911 call using an E911 mobile ALI system such as that shown in FIG. 1.
Figure 3:
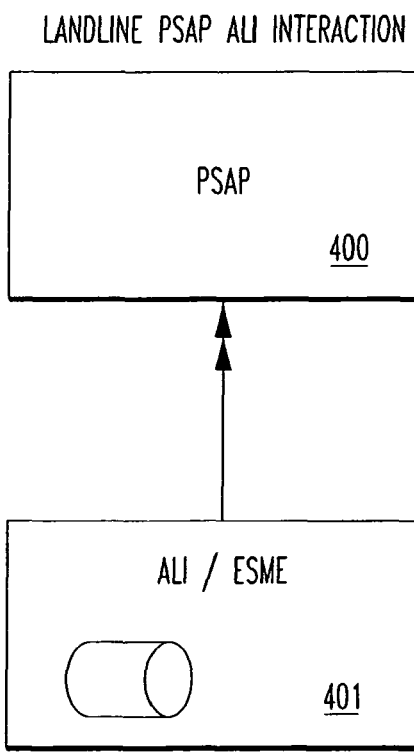
FIG. 3 shows a conventional landline public safety access point (PSAP) to automatic location identifier (ALI) connection.
Figure 4:
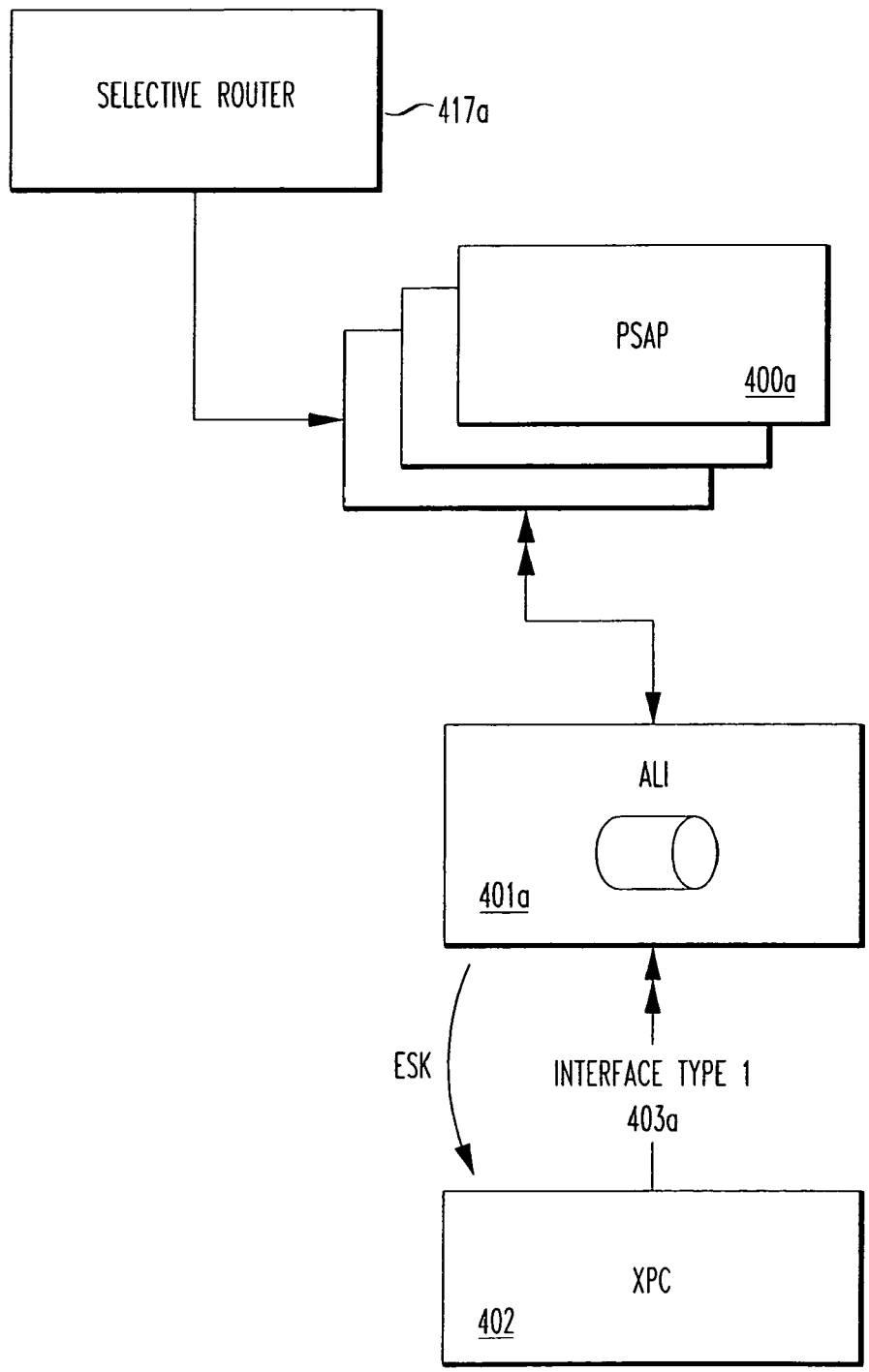
FIG. 4 shows a context diagram for a conventional non-landline positioning center (e.g., an Internet based voice over Internet Protocol (VoIP) positioning center).

FIG. 2 shows an exemplary mobile ALI call flow tracing a 911 call using an E911 mobile ALI system such as that shown in FIG. 1.

In particular, as shown in step 1 of FIG. 2, at the time of service establishment (or other appropriate time), a caller's ALI data is uploaded into an appropriate database (i.e., the ALI database). Typically, this will be an ALI database managed by the PSAP or the LEC or an MPCNPC. Additional data can be loaded by the customer above and beyond the traditional ALI data. For example, the customer might wish to alert responders that they have pets (in case of fire), or that they are allergic to morphine, etc.

In step 2, the emergency caller dials 911 from any device, e.g., wireless, landline, voice over Internet protocol (VoIP), etc.

In step 3, the emergency call is directed to the PSAP via traditional methods. That is, the emergency call is routed to the PSAP via existing technology or via next generation Internet Protocol (IP). The PSAP queries the ALI database via existing or future IP technology, and receives ALI data via traditional methods, and retrieves ALI data.

In step 4a, the xPC stages data in a hosted web page that relates the ESxK with the ALI data for that call.

In step 4b, the PSAP dispatcher accesses the hosted ALI web site for additional ALI information data. The PSAP dispatcher also annotates the web site with responder assignment. Thus, the ALI data web page 101 is hosted by the VPC/MPC 204, and the initial ALI data and ESxK information is posted by the VPC/MPC 204 (step 4a). In the disclosed embodiments, the dispatcher merely adds the dispatched vehicle information in step 4b.

Thus, using the caller's telephone number, the PSAP queries a separate web site for additional ALI data. Via this web site, the PSAP dispatcher enters the responder info that identifies which responder was assigned to this call. In some cases, this responder might be a local police precinct, for example. The dispatcher at the precinct can then log into the web site and add information as to which specific patrol car was dispatched to the scene. The dispatcher at the PSAP or at the precinct can also view what other patrol cars have been dispatched to what other emergencies.

In step 5, the PSAP dispatcher relays caller information data to the local first responder, or dispatches responders directly via radio.

Thus, the local responder receives the verbal dispatch and logs onto the web site. The responder can input his/her own ID and can then view information related to calls that have been dispatched to him/her. The responders can also view what fellow responders have been dispatched to other emergencies.

In step 6, if related to an intermediate dispatcher, the intermediate dispatcher accesses the web site and updates the ultimate responder information. The responder can add additional data to the web site related to the status of the response.

In step 7, when the responder receives the radio call, they log into the web site.

In step 8, the web site displays all data related to the emergency call, plus data for all other responders.

Benefits of the invention include, aside from facilitating individual emergency responses and overall emergency management, the responders' management can use this web site to download daily summary reports.

The invention has particular use with any public safety entity involved in emergency response, particularly those related to E911.

While the invention has been described with reference to the exemplary embodiments thereof, those skilled in the art will be able to make various modifications to the described embodiments of the invention without departing from the true spirit and scope of the invention.

What is claimed is:

1. A method for providing location information to a first responder, comprising:
    obtaining at a public safety answering point (PSAP), location information regarding a location of an emergency caller;
    presenting said location information to a web page accessible by a first responder; and
    permitting said first responder access to said location information via said web page;
    wherein said location information is displayed on said web page showing an association with a respective emergency call.

2. The method for providing location information to a first responder according to claim 1, wherein:
    said web page is adapted to display a plurality of emergency calls, each of said plurality of emergency calls being associated with location information obtained by a respective PSAP, and each of said plurality of emergency calls being presented to said web page by said respective PSAP.

3. The method for providing location information to a first responder according to claim 1, wherein:
    said location information is obtained from an Automatic Location Identification (ALI) network entity.

4. The method for providing location information to a first responder according to claim 1, wherein:
    said web page is publicly accessible.

5. The method for providing location information to a first responder according to claim 1, wherein:
    said first responder is a police car.

6. The method for providing location information to a first responder according to claim 1, wherein:
    said first responder is an ambulance.

7. The method for providing location information to a first responder according to claim 1, wherein:
    said first responder is a fire truck.

8. Apparatus for providing location information to a first responder, comprising:
    means for obtaining at a public safety answering point (PSAP), location information regarding a location of an emergency caller;
    means for presenting said location information to a web page accessible by a first responder; and
    means for permitting said first responder access to said location information via said web page;
    wherein said location information is displayed on said web page showing an association with a respective emergency call.

9. The apparatus for providing location information to a first responder according to claim 8, wherein:
    said web page is adapted to display a plurality of emergency calls, each of said plurality of emergency calls being associated with location information obtained by a respective PSAP, and each of said plurality of emergency calls being presented to said web page by said respective PSAP.

10. The apparatus for providing location information to a first responder according to claim 8, wherein:
    said location information is adapted to be obtained from an Automatic Location Identification (ALI) network entity.

11. The apparatus for providing location information to a first responder according to claim 8, wherein:
    said web page is adapted to be publicly accessible.

12. The apparatus providing location information to a first responder according to claim 8, wherein:
    said first responder is a police car.

13. The apparatus for providing location information to a first responder according to claim 8, wherein:
    said first responder is an ambulance.

14. The apparatus for providing location information to a first responder according to claim 8, wherein:
    said first responder is a fire truck.

* * * * *